US009934152B1

United States Patent
Bryant et al.

(10) Patent No.: US 9,934,152 B1
(45) Date of Patent: Apr. 3, 2018

(54) METHOD AND APPARATUS TO USE HARDWARE ALIAS DETECTION AND MANAGEMENT IN A VIRTUALLY INDEXED PHYSICALLY TAGGED CACHE

(71) Applicant: Marvell International Ltd., Hamilton (BM)

(72) Inventors: Richard Bryant, Chandler, AZ (US); R. Frank O'Bleness, Tempe, AZ (US); Sujat Jamil, Gilbert, AZ (US); Kim Schuttenberg, Gilbert, AZ (US)

(73) Assignee: Marvell International Ltd., Hamilton (BM)

( * ) Notice: Subject to any disclaimer, the term of this patent is extended or adjusted under 35 U.S.C. 154(b) by 25 days.

(21) Appl. No.: 15/046,366

(22) Filed: Feb. 17, 2016

Related U.S. Application Data

(60) Provisional application No. 62/117,194, filed on Feb. 17, 2015.

(51) Int. Cl.
*G06F 12/00* (2006.01)
*G06F 12/0875* (2016.01)
*G06F 12/0891* (2016.01)
*G06F 12/10* (2016.01)

(52) U.S. Cl.
CPC ...... *G06F 12/0875* (2013.01); *G06F 12/0891* (2013.01); *G06F 12/10* (2013.01); *G06F 2212/452* (2013.01); *G06F 2212/50* (2013.01); *G06F 2212/60* (2013.01)

(58) Field of Classification Search
CPC .. G06F 12/0875; G06F 12/0891; G06F 12/10; G06F 2212/452; G06F 2212/50; G06F 2212/60
USPC ........................................................ 711/125
See application file for complete search history.

(56) References Cited

U.S. PATENT DOCUMENTS

| | | | | |
|---|---|---|---|---|
| 5,933,844 A | * | 8/1999 | Young ................. | G06F 12/1063 711/135 |
| 6,594,728 B1 | * | 7/2003 | Yeager ................ | G06F 12/0851 711/120 |
| 7,870,325 B2 | * | 1/2011 | Joukan ................ | G06F 12/1054 711/3 |

(Continued)

OTHER PUBLICATIONS

Cache_design UCSD Summary of cseweb.ucsd.edu (CSE240A-MBT-L15-Cache.ppt ): Feb. 13, 2015, p. 15.*

(Continued)

*Primary Examiner* — Matthew Bradley

(57) ABSTRACT

Systems and techniques relating to hardware alias detection and management in caches are described. A cache controller can receive a cache request that specifies a virtual address, which includes a virtual page number (VPN) and a page offset; access, concurrently, one or more primary tags in a slot of the cache corresponding to a primary cache index that is based on a portion of the page offset and a portion of the VPN and one or more secondary tags in one or more slots corresponding to one or more secondary cache indices that are based on the portion of the page offset and one or more variations of the portion of the VPN; and determine whether there are any primary or secondary matching ways. The controller can write store data to a primary matching way if it exists and perform an alias management operation if any secondary matching ways exist.

20 Claims, 10 Drawing Sheets

(56) References Cited

U.S. PATENT DOCUMENTS 9,110,830 B2 * 8/2015 Dieffenderfer ...... G06F 12/1045

OTHER PUBLICATIONS

4 Cache Organization 18-548/15-548 Memory System Architecture Philip Koopman Sep. 2, 1998.*

* cited by examiner

METHOD AND APPARATUS TO USE HARDWARE ALIAS DETECTION AND MANAGEMENT IN A VIRTUALLY INDEXED PHYSICALLY TAGGED CACHE

CROSS REFERENCE TO RELATED APPLICATIONS

This disclosure claims the benefit of the priority of U.S. Provisional Application Ser. No. 62/117,194 filed Feb. 17, 2015, titled "Method and Apparatus to Use Hardware Alias Detection and Management in a VIPT (Virtually Indexed Physically Tagged) Cache." The above-identified application is incorporated herein by reference in its entirety.

BACKGROUND

This disclosure relates to processor cache logic designs.

Computer systems can include one or more processors to execute programs and a main memory such as random access memory (RAM) to store data associated with the programs. Further, computer systems can include memory such as one or more data caches to cache data from or to main memory to increase performance and one or more instruction caches to cache program instructions. A program can include load instructions to read data from main memory and store instructions to write data to main memory. If a cache does not have the requested data, a cache miss occurs and the system has to access data from another memory such as a different layer of cache or from main memory.

SUMMARY

The present disclosure includes systems and techniques related to hardware alias detection and management in caches. According to an aspect of the described systems and techniques, a technique includes receiving, at a controller associated with a cache, a cache request that specifies a virtual address, the virtual address including a virtual page number and a page offset, the cache including slots, wherein each of the slots includes one or more ways and one or more tags; accessing, concurrently, (i) one or more primary tags in a slot of the slots corresponding to a primary cache index that is based on a portion of the page offset and a portion of the virtual page number and (ii) one or more secondary tags in one or more slots of the slots corresponding to one or more secondary cache indices that are based on the portion of the page offset and one or more variations of the portion of the virtual page number; determining a physical page number that is associated with the virtual page number; comparing the physical page number to the one or more primary tags to determine whether there is a primary matching way; comparing the physical page number to the one or more secondary tags to determine whether there are one or more secondary matching ways; if the cache request is associated with a load instruction, returning read data from the primary matching way or the one or more secondary matching ways; and if the cache request is associated with a store instruction, writing store data to the primary matching way if it exists and perform an alias management operation if the one or more secondary matching ways exist.

This and other implementations can include one or more of the following features. An alias management operation can include writing the store data to the one or more secondary matching ways. An alias management operation can include invalidating the one or more secondary matching ways. In some implementations, the one or more primary tags and the one or more secondary tags are concurrently compared to the physical page number. Implementations can include qualifying an operation that is responsive to the cache request by checking whether any of the one or more secondary matching ways exist, wherein the one or more secondary tags are compared to the physical page number after the one or more primary tags are compared to the physical page number. In some implementations, the portion of the virtual page number includes at least two bits of the virtual page number. A cache request can be associated with the load instruction and the controller can be configured to return data from the one or more secondary matching ways, if existing, to avoid a cache miss if the primary matching way does not exist. Implementations can include swapping slots to write the store data to avoid an alias condition if the portion of the virtual page number that is used to form the primary cache index changes during address translation.

The described systems and techniques can be implemented in electronic circuitry, computer hardware, or in combinations of them, such as the structural means disclosed in this specification and structural equivalents thereof. One or more disclosed embodiments can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

A described system can include a cache including slots, each of the slots including one or more ways and one or more tags; and a controller coupled with the cache. The controller can be configured to receive a cache request that specifies a virtual address, the virtual address including a virtual page number and a page offset; access, concurrently, (i) one or more primary tags in a slot of the slots corresponding to a primary cache index that is based on a portion of the page offset and a portion of the virtual page number and (ii) one or more secondary tags in one or more slots of the slots corresponding to one or more secondary cache indices that are based on the portion of the page offset and one or more variations of the portion of the virtual page number; determine a physical page number that is associated with the virtual page number; compare the physical page number to the one or more primary tags to determine whether there is a primary matching way; and compare the physical page number to the one or more secondary tags to determine whether there are one or more secondary matching ways. If the cache request is associated with a load instruction, the controller can be configured to return read data from the primary matching way or the one or more secondary matching ways. If the cache request is associated with a store instruction, the controller can be configured to write store data to the primary matching way if it exists and perform an alias management operation if the one or more secondary matching ways exist.

This and other implementations can include one or more of the following features. An alias management operation can include writing the store data to the one or more secondary matching ways. An alias management operation can include invalidating the one or more secondary matching ways. In some implementations, the one or more primary tags and the one or more secondary tags are concurrently compared to the physical page number. The controller can be configured to qualify an operation that is responsive to the cache request by checking whether any of the one or more secondary matching ways exist, where the one or more secondary tags are compared to the physical page number after the one or more primary tags are compared to the physical page number. In some implementations, the portion of the virtual page number includes at least two bits of the virtual page number. In some implementations, the cache request is associated with the load instruction, and the controller is configured to return data from the one or more secondary matching ways, if existing, to avoid a cache miss if the primary matching way does not exist. In some implementations, the controller is further configured to swap slots to write the store data to avoid an alias condition if the portion of the virtual page number that is used to form the primary cache index changes during address translation.

A system can include a cache including slots, where each of the slots includes one or more ways and one or more tags; circuitry configured to receive a cache request that specifies a virtual address, the virtual address including a virtual page number and a page offset; circuitry configured to access one or more primary tags in a slot of the slots corresponding to a primary cache index that is based on a portion of the page offset and a portion of the virtual page number; circuitry configured to access one or more secondary tags in one or more slots of the slots corresponding to one or more secondary cache indices that are based on the portion of the page offset and one or more variations of the portion of the virtual page number; circuitry configured to compare a physical page number that is associated with the virtual page number to the one or more primary tags to determine whether there is a primary matching way; circuitry configured to compare the physical page number to the one or more secondary tags to determine whether there are one or more secondary matching ways; circuitry configured to return, if the cache request is associated with a load instruction, read data from the primary matching way or the one or more secondary matching ways; and circuitry configured to write, if the cache request is associated with a store instruction, store data to the primary matching way if it exists and perform an alias management operation if the one or more secondary matching ways exist.

The described systems and techniques can result in one or more of the following advantages. A described technology can tolerate cache aliases without increasing instruction latency for common cases. A true cache miss can be determined without resolving a prediction. A described technology can increase cache design flexibility. A described technology can increase cache hit rates by checking and using aliased locations to satisfy load operations.

Details of one or more implementations are set forth in the accompanying drawings and the description below. Other features and advantages may be apparent from the description and drawings, and from the claims.

DRAWING DESCRIPTIONS

Figure 6A:
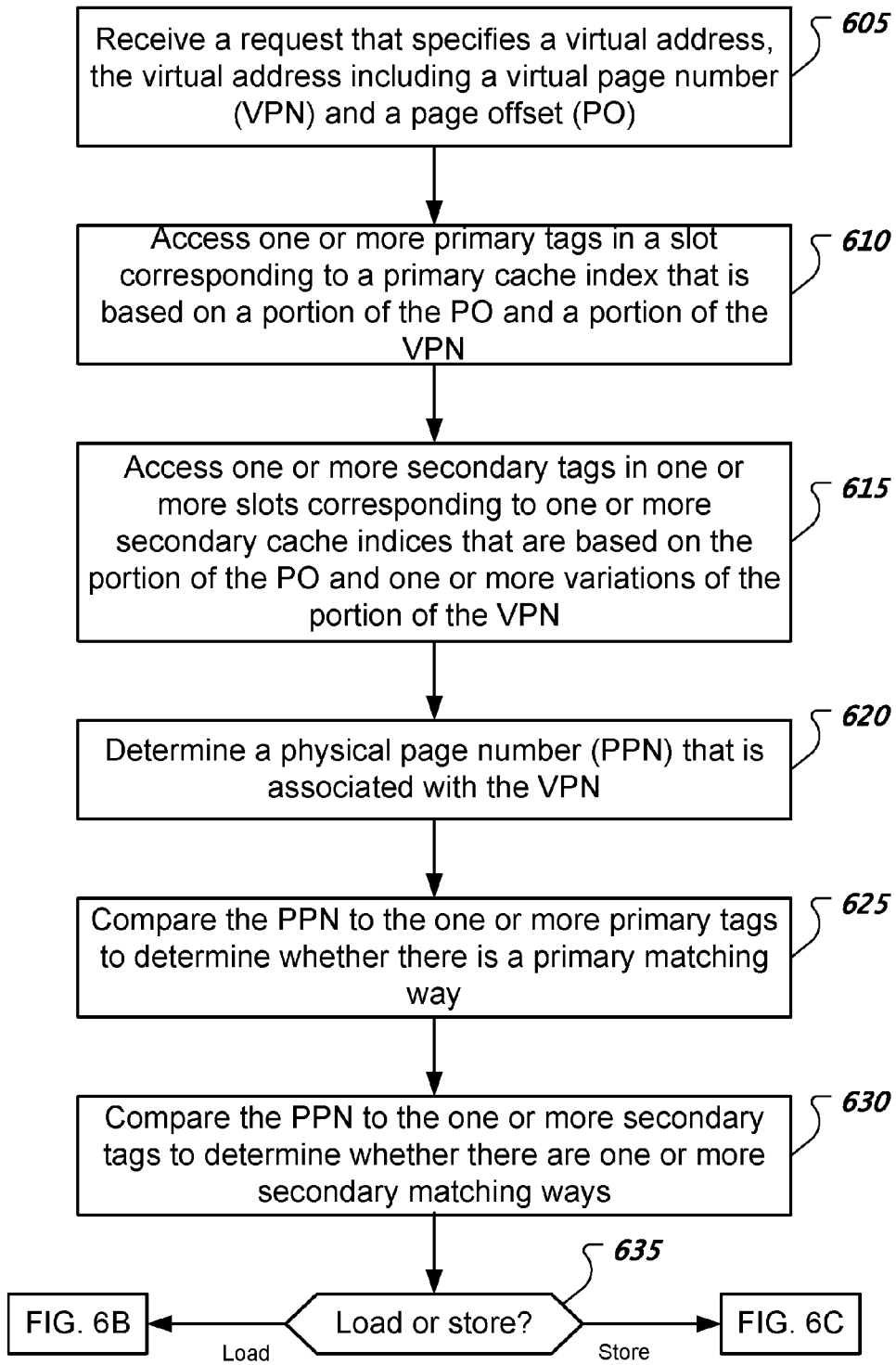
Figure 6B:
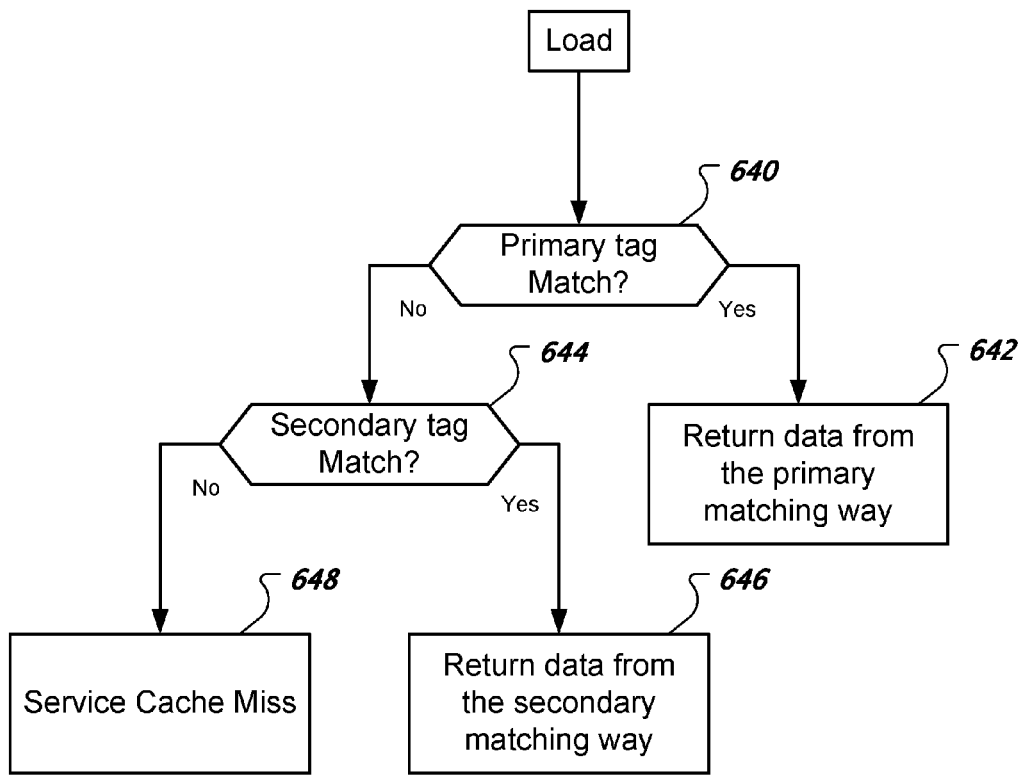
Figure 6C:
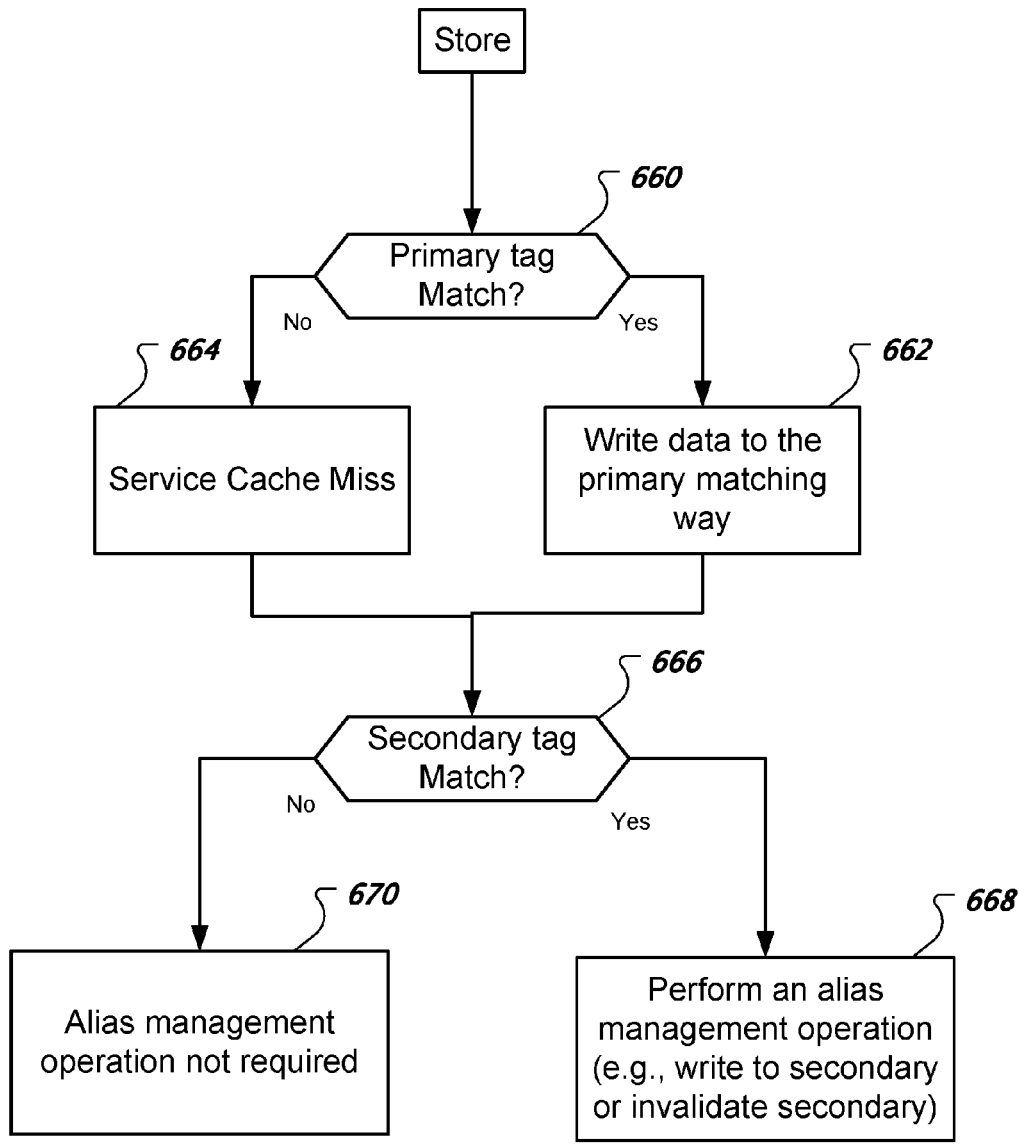

FIGS. 6A, 6B, and 6C show flowcharts of an example of a cache process.

Figure 7:
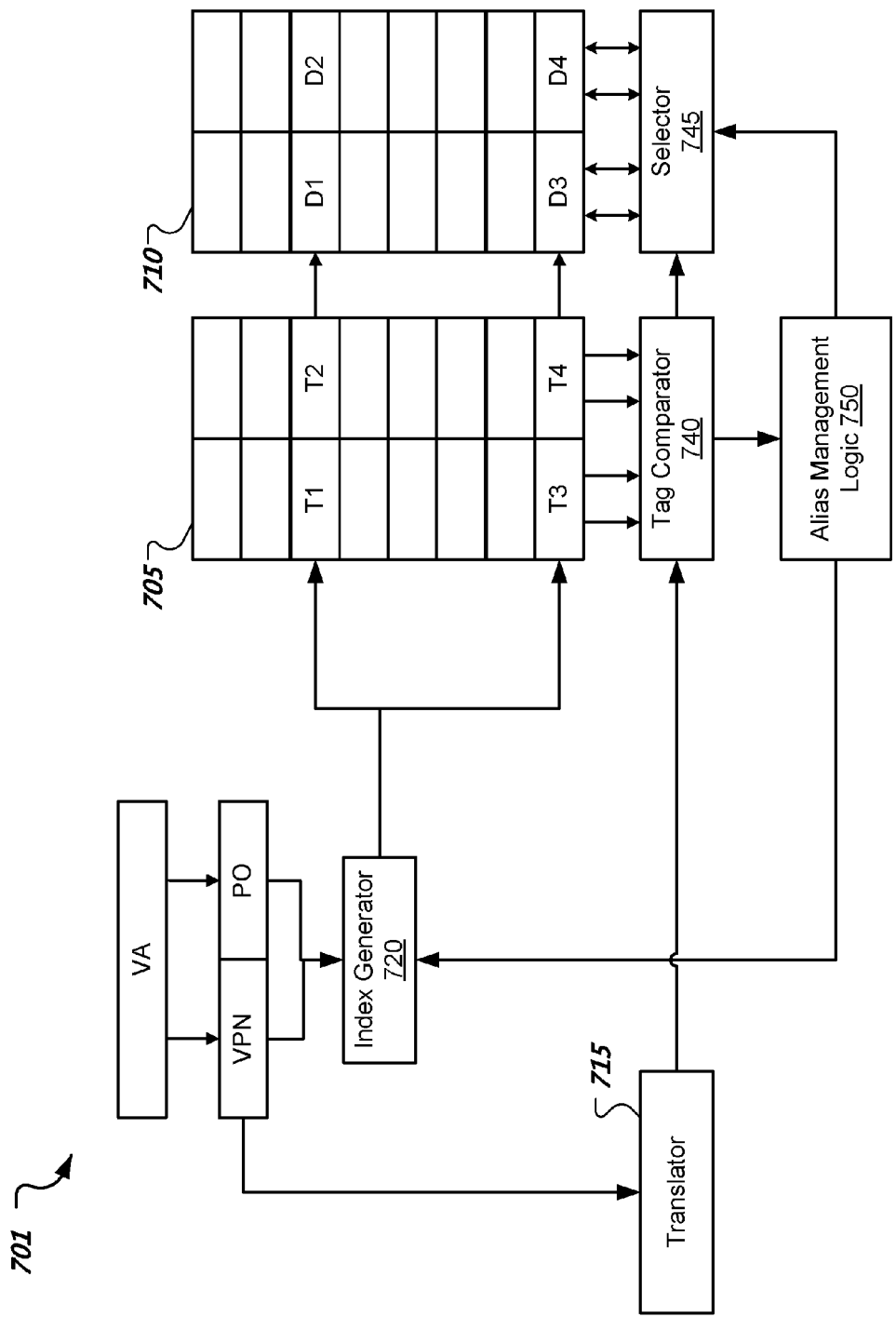

FIG. 7 shows an architecture of an example of a cache system that includes cache and control logic.

Figure 8:
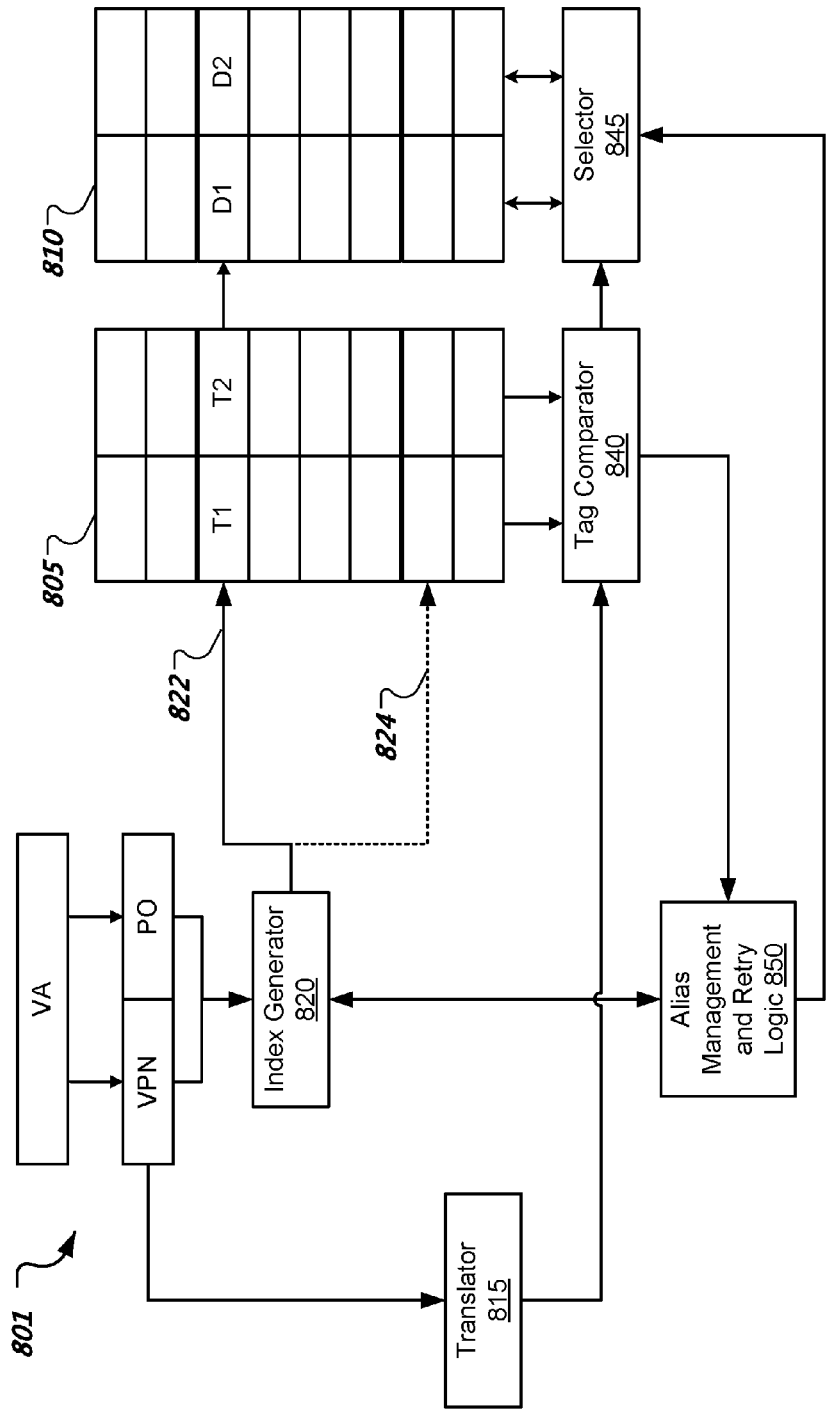

FIG. 8 shows an architecture of another example of a cache system that includes cache and control logic.

Like reference symbols in the various drawings indicate like elements.

DETAILED DESCRIPTION

In micro-architecture design, high speed parallel caches can be used to reduce the latency in load operations. One feature of a low latency cache in a processor is that a cache controller can begin the process of retrieving data before the address of the data is fully known. In particular, the cache controller can begin the access before the translation between the virtual address and the physical address is completed. These caches are known as virtually indexed, physically tagged (VIPT) caches. In cache architectures where a set address, e.g., index, can be derived from address bits that are invariant in the address translation, there is no possible conflict, e.g., no true aliasing, but this may limit the number of sets, e.g., slots, within a cache. This can be disadvantageous because it reduces cache design flexibility, e.g., making the cache larger may require adding more ways to the cache, instead of adding more sets.

In the scenario where the number of slots in a cache is such that the bits used to determine the cache index are overlapped with bits that change during address translation, some cache architectures can handle this scenario by either slowing down the data read to wait for the address translation to complete or accepting and dealing with the possibility of cache aliasing. Cache aliasing is the case where the same physical address does not always map to the same slot, e.g., a physical address may map to slot index 0 or slot index 128. In other words, different virtual addresses may refer to the same physical address, but the virtual addresses may map to different cache indices. It is possible for multiple processes, or a single process, to have different virtual to physical mappings that place the same cache line in different slots of the cache forming multiple aliased locations. Some cache architectures can predict or guess which of the aliased locations the operation's cache line would be in, and if the cache line is not there, check another possible location, and repeat this until all possible slots are exhausted, or the cache line is found. This works well when the prediction is correct and the desired address's cache line is actually cached. However, when the prediction is wrong, or the cache line is not cached, the sequence of iteratively retrying may increase cache latency and energy consumption.

A cache architecture can use a hardware alias detection and correction technique to manage cache aliasing. This technique can avoid performance penalties for common cases (e.g., no aliasing) where only one mapping is used for a particular address. Further, this technique can increase cache hit rates by checking and using aliased locations, if appropriate, to satisfy load operations. For aliasing cases, the technique includes determining whether the alias is a "false" alias where no corrective action is required or a "true" alias where the cache is required to be managed in order to ensure correct behavior. False aliases, for example, are where different virtual addresses map to the same slot (e.g., no duplicate cache lines occurs). True aliases, for example, are where different virtual addresses map to different slots (e.g., duplicate cache lines within different slot occurs).

This technique can avoid prediction of physical tag indices by using the virtual index in place of the physical index and correcting the cache if an alias that requires correction is detected. This can be done by filling data into the cache using the virtual address. In the common case, subsequent loads to the same page can look up the cache using their virtual address and function properly. Issues may arise when an aliased page mapping exists in which a different virtual address points to the same physical address and the virtual address uses a different value for the index portion of the translation. In this case, the aliased load address may not exist in an expected location in the cache. However, the aliased load address may exist in one or more aliased locations in the cache. In order to detect this, all possible aliased locations can be checked for cache hits. In some implementations, if any aliased location contains modified data, the data must be returned from the cache, if the data are a "clean" hit, e.g., unmodified, then the data can be returned from the cache or from the next level of memory. This technique can determine a true cache miss without resolving a prediction which can result in decreased latency compared to predictive techniques that require all predictions to be resolved before the operation can continue.

To check all locations inclusive of aliased locations, a cache controller can look up and compare multiple tags in the cache. The cache controller can directly use a virtual address to compute a cache index and check the corresponding "primary" location in the cache. Further, the cache controller can use one or more variations of the virtual address to compute one or more cache indices and check the corresponding one or more "secondary" locations in the cache. In some implementations, the primary location and the one or more secondary locations are checked concurrently. In some implementations, the one or more secondary locations are checked at a subsequent time after the primary location to qualify a cache operation. Checking a location can include comparing one or more cache tags. In some implementations, tag storage can be arranged such that no extra storage is required in order to access all possible locations.

In some implementations, when a true alias exists that involves a modified cache line and an unmodified cache line at different slots, a cache operation can include rereading the cache using the index corresponding to the modified cache line. In some implementations, when a true alias exists that involves a modified cache line and an unmodified cache line at different slots, a cache operation can include cleaning and/or invalidating the unmodified cache line and re-attempting the operation. In some implementations, a cleaned cache line can be automatically filled back with the aliased index, e.g., the unmodified cache line is replaced by a copy of the modified cache line. Note that if maintained properly, it is acceptable to have the same unmodified cache line in multiple locations in the cache. If an implementation allows multiple aliased copies of a cache line to be valid in the cache and a store hits more than one copy, a cache controller can update all hit locations or invalidate the aliased location(s). In some implementations, cache maintenance operations can lookup and operate on all valid copies of a cache line.

Figure 1:
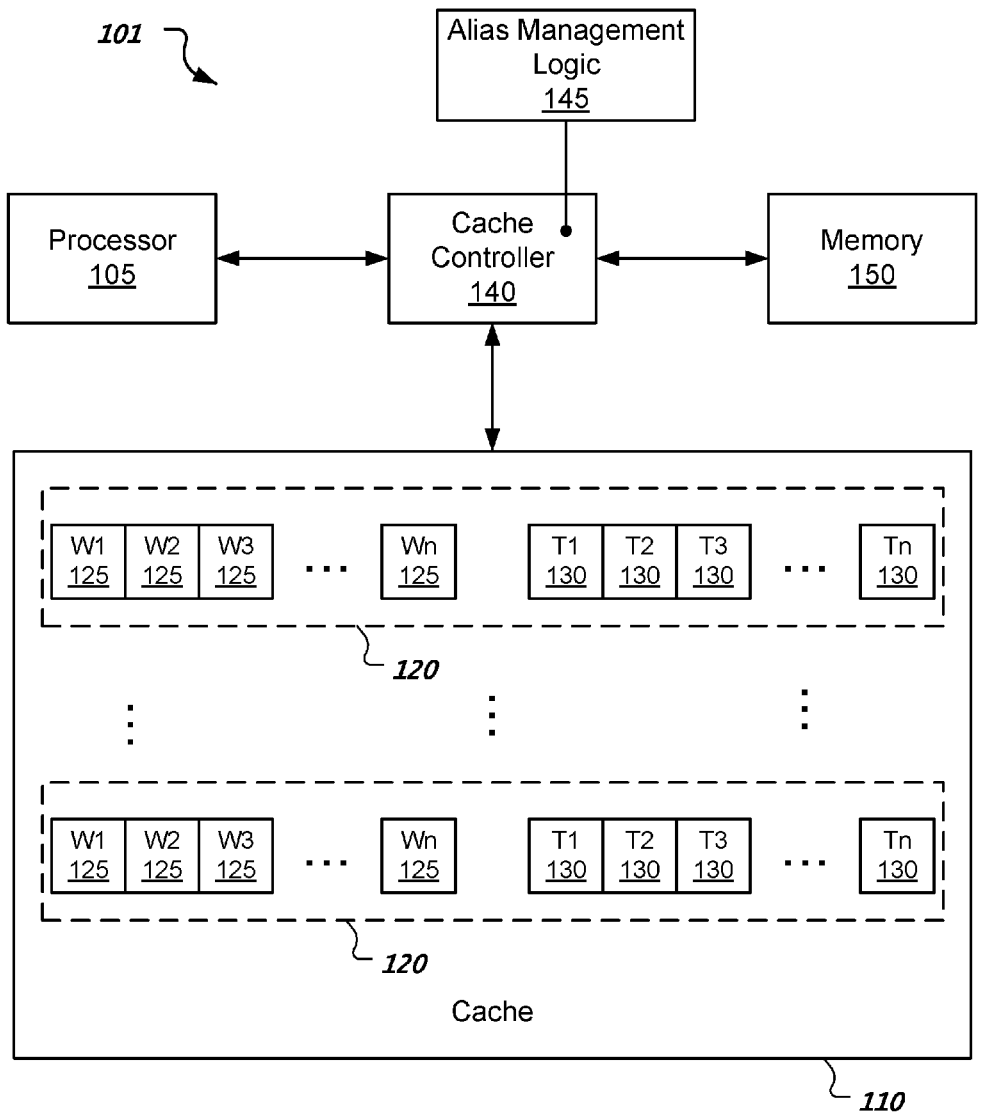
FIG. 1 shows a high-level architecture of an example of a computer system that includes alias detection and management hardware for a cache.

FIG. 1 shows a high-level architecture of an example of a computer system 101 that includes alias detection and management hardware for a cache 110. The computer system 101 can include one or more processors 105, cache 110, cache controller 140, and memory 150. The cache 110 can include a data cache, an instruction cache, or both. In some implementations, memory 150 is a higher level cache. In some implementations, memory 150 is a main memory that includes RAM. In some implementations, the computer system 101 is a multi-core system with each processor core having its own cache and cache controller. In some implementations, a processor 105 can include one or more processor cores.

The cache 110 can be an N-way set associative cache. The cache 110 includes multiple slots 120. Note that a slot can be referred to as a set. Each of the slots 120 includes N ways 125 (labelled W1, W2, ..., Wn). For example, N can be 2, 4, or 8. However, other values for N are possible. A way 125 can store a cache line, e.g., a contiguous block of data. Each of the slots 120 includes N tags 130 that correspond to the N ways 125. A processor 105 can execute load and store instructions that produce memory requests. The cache controller 140 can generate an index based on a memory address associated with a load or store instruction. The cache controller 140 can access data and one or more tags from a slot 120 that corresponds to the index. Since an index is smaller than a memory address (e.g., cache size can be significantly smaller than main memory), multiple addresses can map to a slot 120. Accordingly, a tag 130 is used in conjunction with the index to determine whether there is a cache hit (data present) or a cache miss (data not present).

If the cache 110 cannot satisfy a memory request from the processor 105, the cache controller 140 can load one or more data elements corresponding to the memory request from memory 150 in to the cache 110. The cache controller 140 may have to overwrite data within a slot 120 to store new data. To handle new data, a way 125 within a slot 120 can be selected based on a cache replacement policy such as least recently used (LRU) or first in first out (FIFO).

The cache controller 140 can include alias management logic 145. The alias management logic 145 can be configured to perform alias checks on store operations and take corrective action if required to maintain correct cache operations. Further, the alias management logic 145 can be configured to use cache aliasing beneficially to reduce cache misses, e.g., by checking an aliased location before declaring a cache miss. In some implementations, the computer system 101 is implemented as a system-on-a-chip (SoC). In some implementations, the one or more processors 105, cache 110, cache controller 140 (including logic 145) can be implemented on a single integrated circuit (IC). In some implementations, the alias management logic 145 can exist outside of the cache controller 140.

Figure 2:
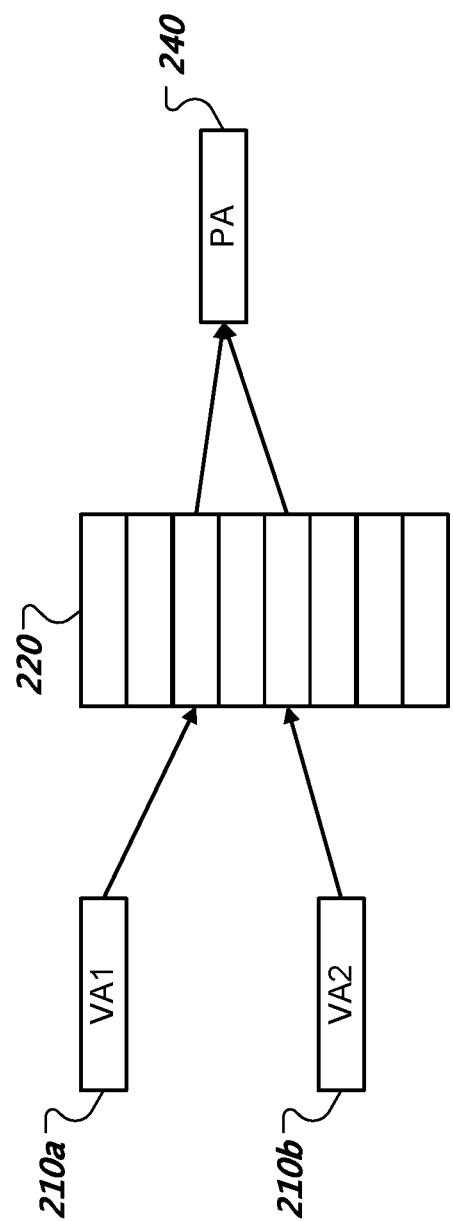
FIG. 2 shows an example of a virtual address aliasing problem in a virtually address physically tagged cache.

FIG. 2 shows an example of a virtual address aliasing problem in a virtually address physically tagged cache. In this example, data from different virtual addresses 210a, 210b are placed into different slots of a cache 220. However, the virtual addresses 210a, 210b corresponding to the same physical address 240. Issues arise if a write occurs to one of the virtual addresses 210a, 210b but not the other. In this case, all other copies within the cache 220 that correspond to the same physical address 240 can be updated or invalidated so that there are no data inconsistency issues.

Figure 3:
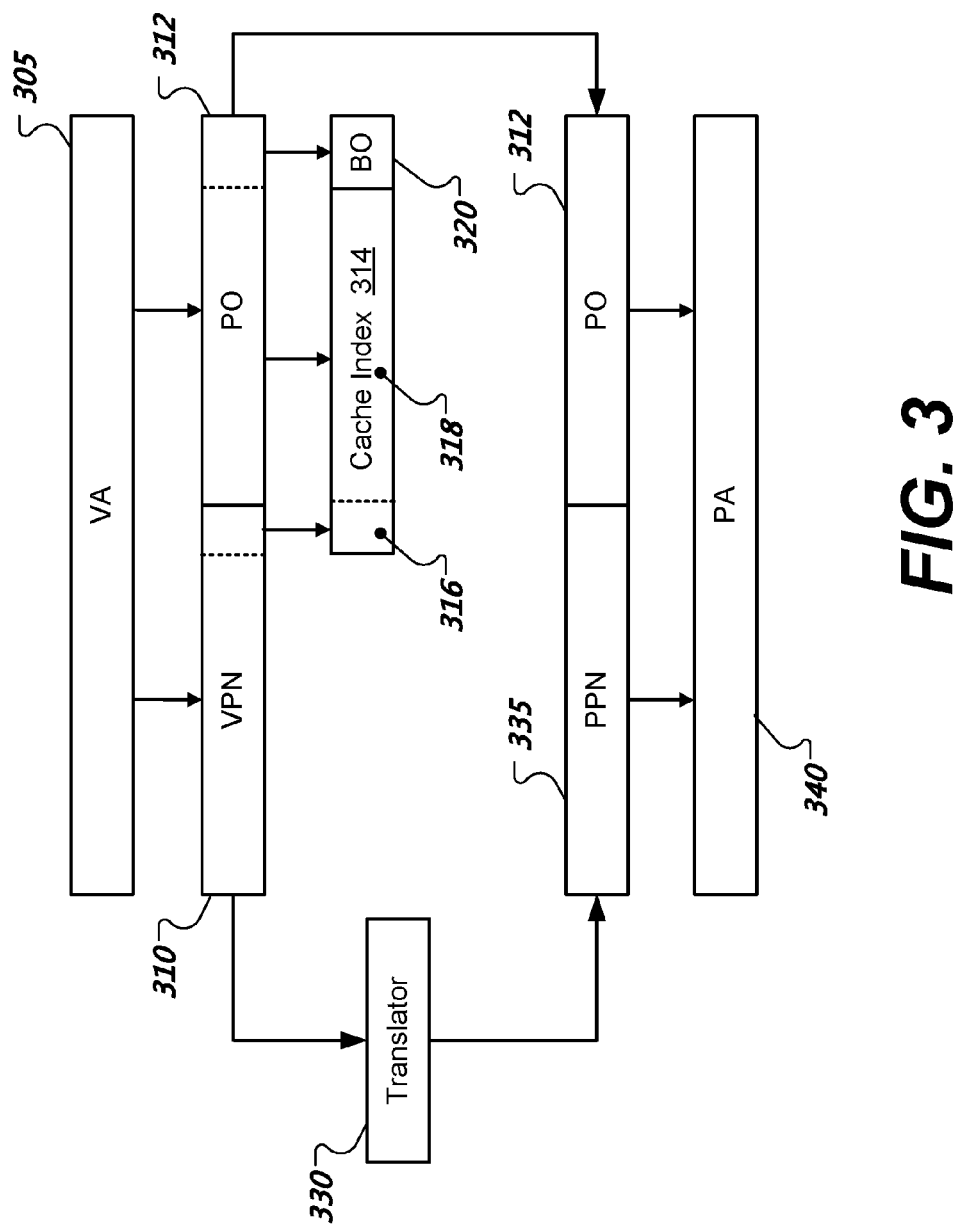
FIG. 3 shows an example of virtual address to cache index and physical address translation.

FIG. 3 shows an example of virtual address to cache index and physical address translation. A virtual address 305 is split into a virtual page name (VPN) 310 and a page offset (PO) 312. A translator 330 translates the VPN 310 into a physical page name (PPN) 335. Together the PPN 335 and the PO 312 form a physical address 340. A cache index 314 can be formed from the virtual address 305. In some systems, a cache index was formed exclusively based on the upper portion of the PO 312, e.g., the PO 312 excluding the block offset (BO) 320. However, in this example, a cache index 314 is formed based on the upper portion of the PO 312 and a lower portion of the VPN 310. Thus, the cache index 314 includes one or more "translatable" bits 316 that come from a less significant bit portion of the VPN 310 which is inclusive of the least significant bit (LSB). The one or more translatable bits 316 are so-called because these bits go through translation via the translator 330. The one or more translatable bits 316 form a more significant bit portion, inclusive of the most significant bit (MSB), of the cache index 314. The number of translatable bits 316 within the cache index 314 is a design parameter, for example, the number can be one, two, or more bits.

Further, the cache index 314 includes one or more "invariant" bits 318 that come from the MSB portion of the PO 312. The one or more invariant bits 318 are so-called because these bits do not go through translation via the translator 330. The one or more invariant bits 318 form a LSB portion of the cache index 314. If the one or more translatable bits 316 do not change between the VPN 310 and the PPN 335, then the cache index 314 can be deemed to refer to a nominal, non-aliased location within the cache. If the one or more translatable bits 316 do change between the VPN 310 and the PPN 335, then the cache index 314 can be deemed to refer to an aliased location within the cache.

Figure 4:
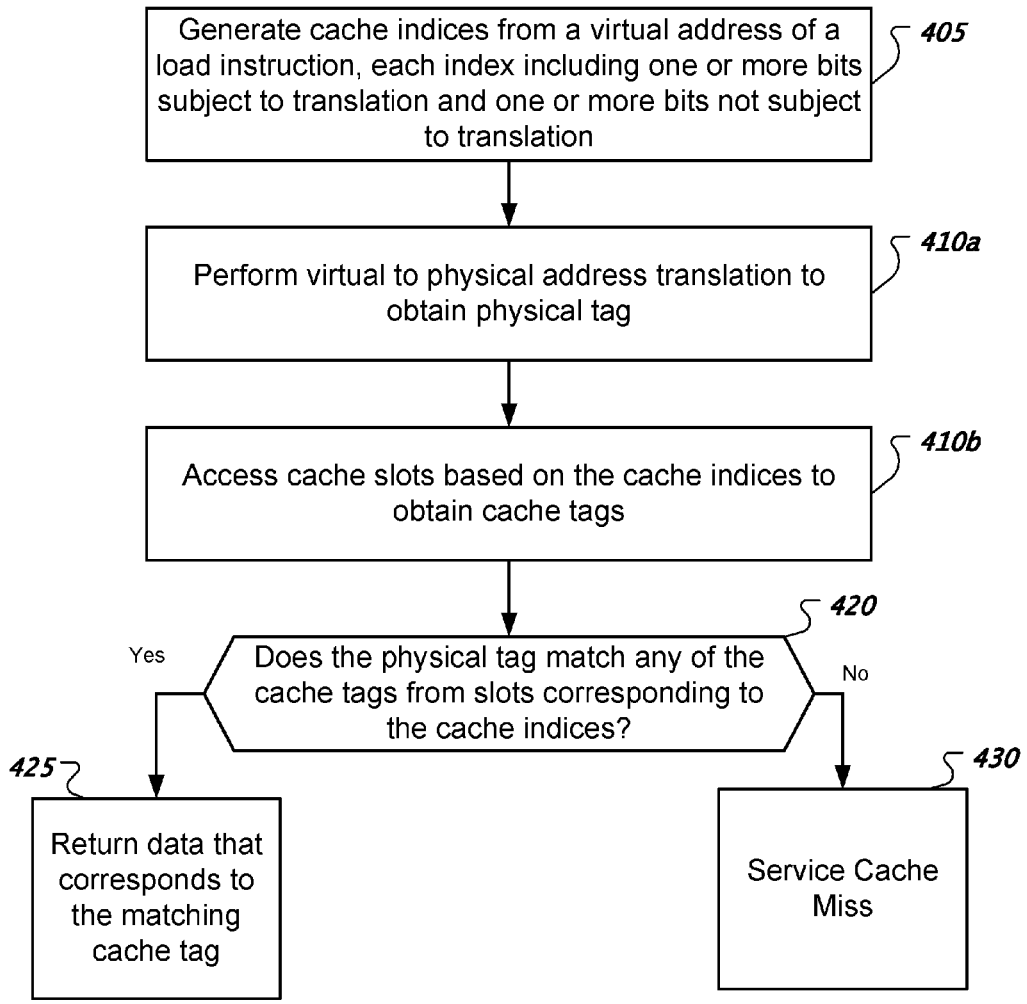
FIG. 4 shows a flowchart of an example of a cache process associated with a load instruction.

FIG. 4 shows a flowchart of an example of a cache process associated with a load instruction. The illustrated cache process can be implemented in software, firmware, hardware, or any combination thereof. For example, the illustrated cache process can be performed by a cache controller (e.g., cache controller 140). At 405, the process generates cache indices from a virtual address of a load instruction. Each index can include (i) one or more bits subject to translation, e.g., a portion of a virtual page number component of a virtual address, and (ii) one or more bits not subject to translation, e.g., a portion of a page offset component of the virtual address. Generating the cache indices can include deriving an index based on an unmodified virtual address and deriving one or more indices based on one or modifications of the virtual address. In some implementations, the process, changes the one or more bits subject to translation that are included within in the index to generate additional indices where virtual aliases may exist.

At 410a, the process performs virtual to physical address translation to obtain a physical tag. Performing a virtual to physical address translation can include using a look-up table to translate a virtual address to a physical address. At 410b, the process accesses cache slots based on the cache indices to obtain cache tags. The operations of 410a and 410b can be performed concurrently. At 420, the process determines whether the obtained physical tag matches any of the cache tags from the slots corresponding to the cache indices. If a match exists, then at 425, the process returns data that correspond to the matching cache tag. Otherwise, at 430, the process services a cache miss. Servicing a cache miss can include retrieving data from a higher level of memory based on the physical address and storing the retrieved data in the cache.

Figure 5:
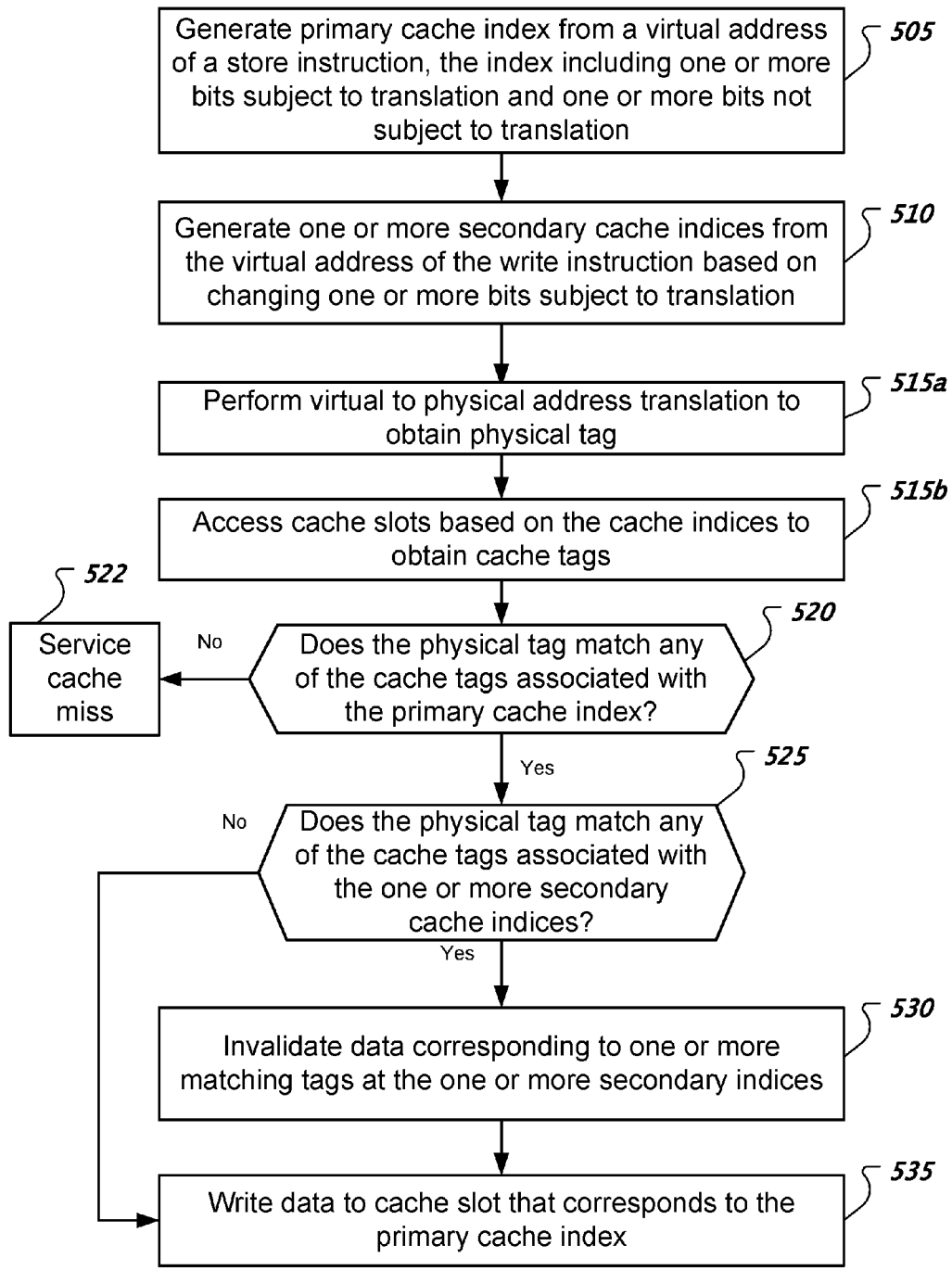
FIG. 5 shows a flowchart of an example of a cache process associated with a store instruction.

FIG. 5 shows a flowchart of an example of a cache process associated with a store instruction. The illustrated cache process can be implemented in software, firmware, hardware, or any combination thereof. For example, the illustrated cache process can be performed by a cache controller, such as the cache controller 140. At 505, the process generates a primary cache index from a virtual address of a store instruction, the index including one or more bits subject to translation and one or more bits not subject to translation. At 510, the process generates one or more secondary indices from the virtual address of the store instruction based on changing one or more bits subject to translation. At 515a, the process performs virtual to physical address translation to obtain a physical tag. At 515b, the process accesses cache slots based on the cache indices to obtain cache tags. The operations of 515a and 515b can be performed concurrently.

At 520, the process determines whether the obtained physical tag matches any of the obtained cache tags associated with the primary cache index. If no match exists, then at 522, the process services a cache miss. If a match exists, then at 525, the process determines whether the physical tag matches any of the cache tags associated with the one or more secondary cache indices. If there is a matching tag at a secondary index, then at 530, the process invalidates data corresponding to one or more matching tags at the one or more secondary indices. Invalidating data can include marking a cache line as invalid. In either case, at 535, the process writes data to the cache slot that corresponds to the primary cache index. In some implementations, if there is a miss at a primary index but a hit at a secondary index, the process can copy a cache line from the secondary index slot into the primary index slot to service a cache miss at 522. In some implementations, if there is a miss at a primary index but a hit at a secondary index, the process can proceed to write to the secondary index slot.

FIGS. 6A, 6B, and 6C show flowcharts of an example of a cache process. The illustrated cache process can be implemented in software, firmware, hardware, or any combination thereof. For example, the illustrated cache process can be performed by a cache controller, such as the cache controller 140. In FIG. 6A at 605, the process receives a request that specifies a virtual address, the virtual address including a virtual page number and a page offset. At 610, the process accesses one or more primary tags in a slot corresponding to a primary cache index that is based on a portion of the page offset and a portion of the virtual page number. The portion of the page offset can include the L more significant bits (inclusive of the MSB) of the page offset, where L is an integer equal to or greater than 1. The portion of the virtual page number can include the M less significant bits (inclusive of the LSB) of the virtual page number, where M is an integer equal to or greater than 1. At 615, the process accesses one or more secondary tags in one or more slots corresponding to one or more secondary cache indices that are based on the portion of the page offset and one or more variations of the portion of the virtual page number. The process can generate the one or more variations by changing one or more bit values within the portion of the virtual page number. The compares at 610 and 615 can be performed concurrently.

At 620, the process determines a physical page number that is associated with the virtual page number. In some implementations, determining a physical page number can include accessing a translation lookaside buffer (TLB) based on the virtual page number to retrieve a corresponding physical page number. At 625, the process compares the physical page number to the one or more primary tags to determine whether there is a primary matching way. Comparing the physical page number can include inputting the physical page number to a comparator that determines whether the physical page number matches any of the one or more primary tags. At 630, the process compares the physical page number to the one or more secondary tags to determine whether there are one or more secondary matching ways. Comparing the physical page number can include inputting the physical page number to a comparator that determines whether the physical page number matches any of the one or more secondary tags. In some implementations, the compares at 625 and 630 are performed concurrently. In some implementations, the compares at 625 and 630 are performed at different times. For example, the compare at 630 can be used to qualify a cache operation. For example, if the compare 630 indicates that an alias exists, a corrective operation can be performed. At 635, the process determines whether the request is associated with a load instruction or a store instruction. For a load, the process continues at FIG. 6B. For a store, the process continues at FIG. 6C.

FIG. 6B shows a flowchart of an example of a load instruction branch of the cache process of FIG. 6A. At 640, the process determines whether there is a primary tag match. If there is a primary tag match, the process returns data from the primary matching way at 642. Otherwise, the process determines whether there is a secondary tag match at 644. If there is a secondary tag match, the process returns data from the secondary matching way at 646. If there are multiple secondary matching ways, then the process can select one of the ways. Otherwise, the process services a cache miss at 648.

FIG. 6C shows a flowchart of an example of a store instruction branch of the cache process of FIG. 6A. At 660, the process determines whether there is a primary tag match. If there is a primary tag match, the process writes data to the primary matching way at 662. If there is not a primary tag match, the process can service a cache miss at 664. Regardless of whether there is a primary tag match, the process determines whether there is a secondary tag match at 666. If there is a secondary tag match, the process performs an alias management operation at 668. If there is not a secondary tag match, the process, at 670, is not required to perform an alias management operation. In some implementations, an alias management operation can include writing the store data to one or more secondary matching ways. In some implementations, an alias management operation can include invalidating the one or more secondary matching ways.

FIG. 7 shows an architecture of an example of a cache system 701 that includes cache and control logic. The system 701 can include a cache that is separated into tag storage 705 and data storage 710. In this example, the cache is a two-way set associative cache and, accordingly, there are two tags and two cache lines for each slot. The tag storage 705 and the data storage 710 can include one or more multi-ported memory structures to enable concurrent access to two or more slots. A translator 715 can translate a VPN portion of a virtual address into a PPN. An index generator 720 can generate cache indices based on the VPN and PO portions of a virtual address. The index generator 720 can include logic to extract bit values from the VPN and PO portions at predetermined bit locations. In some implementations, the alias management logic 750 can cause the index generator 720 to generate different indices for a given virtual address. The system 701 can retrieve tags from the tag storage 705 and provide the tags to a tag comparator 740 for comparison. The tag comparator 740 can compare the tags retrieved from tag storage 705 to the PPN provided by the translator 715 to determine whether there are any hits. In some implementations, a validity bit is checked in addition to a tag. The tag comparator 740 can output the matching index value and way indicator. In this example, the way indicator can specify whether the matching tag is associated with the first way or second way of a slot.

For a load instruction, the selector 745 can output a cache line to a processor based on the matching index value and the way indicator. In some implementations, the selector 745 can output a specific byte or group of bytes from the cache line based on a block offset portion of the virtual address. If there are no matching ways, alias management logic 750 can cause the cache system 701 to load the corresponding cache line from memory into data storage 710 and write the PPN into the tag storage 705 at a corresponding location.

For a store instruction, the selector 745 can write store data generated by a processor to a cache line based on the matching index value and the way indicator. In some implementations, alias management logic 750 can cause store data to be written to all matching ways. In some implementations, alias management logic 750 can cause store data to be written to a primary matching way and can cause any secondary matching ways to be invalidated. In cases where a primary matching way does not exist, but a modified secondary matching way exist, alias management logic 750 can flush the modified secondary matching way to main memory and reread the corresponding cache line into the slot corresponding to the primary index. In some implementations, In cases where a primary matching way does not exist, but a modified secondary matching way exist, the modified secondary matching way is further modified by the store data.

The alias management logic 750, in some implementations, can swap slots to write store data to avoid an alias condition if the portion of the virtual page number that is used to form the primary cache index changes during address translation. In some implementations, false aliases can be avoided by allowing virtual tag aliases to swap locations in the cache. For example, a line that is normally filled into index 0 may fill into index 1 if the virtual index and physical index do not match. Another index that would fill into index 1 can fill into index 0 for the same reason. This "crossing" of locations does not cause a problem and can be managed by adding the cache's highest index bit to a tag comparison to resolve the false alias.

FIG. 8 shows an architecture of an example of a cache system 801 that includes cache and control logic. The system 801 can include a cache that is separated into tag storage 805 and data storage 810. In this example, the cache is a two-way set associative cache and, accordingly, there are two tags and two cache lines for each slot. A translator 815 can translate a VPN portion of a virtual address into a PPN. An index generator 820 can generate a primary cache index 822 based on the VPN and PO portions of a virtual address. The system 801 can use the primary cache index 822 to retrieve tags from the tag storage 805 from the corresponding slot and provide the tags to a tag comparator 840 for comparison.

The tag comparator 840 can compare the tags retrieved from tag storage 805 to the PPN provided by the translator 815 to determine whether there are any hits. In some implementations, a validity bit is checked in addition to a tag. The tag comparator 840 can output the matching way indicator. In this example, the way indicator can specify whether the matching tag is associated with the first way or second way of a slot. For a load instruction, the selector 845 can output a cache line to a processor based on the matching index value and the way indicator. In some implementations, the selector 845 can output a specific byte or group of bytes from the cache line based on a block offset portion of the virtual address.

If the primary cache line does not result in a hit for a load operation, alias management and retry logic 850 can cause the index generator 820 to generate one or more secondary indices 824 to check whether there is a hit in a secondary location, e.g., retry logic 850 causes the system 801 to retry at one or more secondary locations. If there is a hit at a secondary location, the selector 845 can provide the corresponding cache line. In some implementations, data from the secondary location can be duplicated into a primary location. For example, logic 850 can duplicate the cache line from the secondary location to the slot corresponding to the primary cache index 822.

In some implementations, the alias management and retry logic 850 can invoke a corrective action if an alias is detected at a secondary location. For example, a cache operation that tries to write to a primary location when a modified cache line is detected at a secondary location detected can trigger a corrective action. In some implementations, the retry logic 850 will flush the modified cache line to memory and re-read it to the primary location before retrying a write operation.

There are several aliasing scenarios. These scenarios are depicted in the following table.

| Scenario | Original Request | New Request |
| --- | --- | --- |
| 1 | VA1[H:L] == PA1[H:L] | VA2[H:L] == PA2[H:L] |
| 2 | VA1[H:L] != PA1[H:L] | VA2[H:L] == PA2[H:L] |
| 3 | VA1[H:L] == PA1[H:L] | VA2[H:L] != PA2[H:L] |
| 4 | VA1[H:L] != PA1[H:L] | (VA2[H:L] != PA2[H:L] & (VA1[H:L] != VA2[H:L]) |
| 5 | VA1[H:L] != PA1[H:L] | (VA2[H:L] != PA2[H:L] & (VA1[H:L] == VA2[H:L]) |

In Scenario 1, both requests are "correctly" indexed and will map to the same PA. There is no real aliasing issue in this scenario as both VA1 and VA2 will correctly index the same PA.

In scenario 2, the original translation filled cache in an alternate, re-mapped, location (!PA[H:L]) that does not correspond to translation, new request actually points to correctly-mapped location. In this scenario, the new request will miss the cache. However, since both indexed locations are checked via tag-compare, the alternate, re-mapped location will hit, thus indicating that an aliased line exists in the cache. If the cache line is clean, the cache line can be either invalidated or can remain in the cache allowing clean hits using this alias in the future. The access can then either return data from the aliased location or can retrieve the data from the next level of memory. In some implementations, a cache controller can fill another location in the cache with clean data which will allow clean hits to the same unmodified data using either a non-aliased index or an aliased index. If the cache line is modified then the aliased cache line can be cleaned.

In scenario 3, which is in contrast to Scenario 2, the original request is filled in a physically tagged location and the new request is attempting to find the data at an alternate index. Resolution is carried out the same as in Scenario 2.

In scenario 4, which is an extension of Scenario 1, both requests have virtual addresses that map to one or more alternate indices and point to the correct physical data. As with Scenario 1, there is no actual aliasing to resolve in this scenario.

In scenario 5, which is an extension of scenarios 2 and 3, the original request is filled in a virtually tagged index and the new request is attempting to find the data at an alternate virtually tagged index. Resolution is carried out the same as in Scenario 2.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Other embodiments fall within the scope of the following claims.

What is claimed is:

1. An apparatus comprising:
a cache comprising slots, wherein each of the slots comprises one or more ways and one or more tags; and
a controller coupled with the cache, wherein the controller is configured to:
receive a cache request that specifies a virtual address, the virtual address comprising a virtual page number and a page offset,
access, concurrently, (i) one or more primary tags in a slot of the slots corresponding to a primary cache index that is based on a portion of the page offset and a portion of the virtual page number and (ii) one or more secondary tags in one or more slots of the slots corresponding to one or more secondary cache indices that are based on the portion of the page offset and one or more variations of the portion of the virtual page number,
determine a physical page number that is associated with the virtual page number,
compare the physical page number to the one or more primary tags to determine whether there is a primary matching way,
compare the physical page number to the one or more secondary tags to determine whether there are one or more secondary matching ways,
if the cache request is associated with a load instruction, return read data from the primary matching way or the one or more secondary matching ways, and
if the cache request is associated with a store instruction, write store data to the primary matching way if it exists and perform an alias management operation if the one or more secondary matching ways exist.

2. The apparatus of claim 1, wherein the alias management operation comprises writing the store data to the one or more secondary matching ways.

3. The apparatus of claim 1, wherein the alias management operation comprises invalidating the one or more secondary matching ways.

4. The apparatus of claim 1, wherein the one or more primary tags and the one or more secondary tags are concurrently compared to the physical page number.

5. The apparatus of claim 1, wherein the controller is further configured to qualify an operation that is responsive to the cache request by checking whether any of the one or more secondary matching ways exist, wherein the one or more secondary tags are compared to the physical page number after the one or more primary tags are compared to the physical page number.

6. The apparatus of claim 1, wherein the portion of the virtual page number includes at least two bits of the virtual page number.

7. The apparatus of claim 1, wherein the cache request is associated with the load instruction, and wherein the controller is configured to return data from the one or more secondary matching ways, if existing, to avoid a cache miss if the primary matching way does not exist.

8. The apparatus of claim 1, wherein the controller is further configured to swap slots to write the store data to avoid an alias condition if the portion of the virtual page number that is used to form the primary cache index changes during address translation.

9. A method comprising:
   receiving, at a controller associated with a cache, a cache request that specifies a virtual address, the virtual address comprising a virtual page number and a page offset, the cache comprising slots, wherein each of the slots comprises one or more ways and one or more tags;
   accessing, concurrently, (i) one or more primary tags in a slot of the slots corresponding to a primary cache index that is based on a portion of the page offset and a portion of the virtual page number and (ii) one or more secondary tags in one or more slots of the slots corresponding to one or more secondary cache indices that are based on the portion of the page offset and one or more variations of the portion of the virtual page number;
   determining a physical page number that is associated with the virtual page number;
   comparing the physical page number to the one or more primary tags to determine whether there is a primary matching way;
   comparing the physical page number to the one or more secondary tags to determine whether there are one or more secondary matching ways;
   if the cache request is associated with a load instruction, returning read data from the primary matching way or the one or more secondary matching ways; and
   if the cache request is associated with a store instruction, writing store data to the primary matching way if it exists and perform an alias management operation if the one or more secondary matching ways exist.

10. The method of claim 9, wherein the alias management operation comprises writing the store data to the one or more secondary matching ways.

11. The method of claim 9, wherein the alias management operation comprises invalidating the one or more secondary matching ways.

12. The method of claim 9, wherein the one or more primary tags and the one or more secondary tags are concurrently compared to the physical page number.

13. The method of claim 9, comprising:
   qualifying an operation that is responsive to the cache request by checking whether any of the one or more secondary matching ways exist, wherein the one or more secondary tags are compared to the physical page number after the one or more primary tags are compared to the physical page number.

14. The method of claim 9, wherein the portion of the virtual page number includes at least two bits of the virtual page number.

15. The method of claim 9, wherein the cache request is associated with the load instruction, and wherein the method comprises returning data from the one or more secondary matching ways, if existing, to avoid a cache miss if the primary matching way does not exist.

16. The method of claim 9, comprising:
   swapping slots to write the store data to avoid an alias condition if the portion of the virtual page number that is used to form the primary cache index changes during address translation.

17. A system comprising:
   a cache comprising slots, wherein each of the slots comprises one or more ways and one or more tags;
   circuitry configured to receive a cache request that specifies a virtual address, the virtual address comprising a virtual page number and a page offset;
   circuitry configured to access one or more primary tags in a slot of the slots corresponding to a primary cache index that is based on a portion of the page offset and a portion of the virtual page number;
   circuitry configured to access one or more secondary tags in one or more slots of the slots corresponding to one or more secondary cache indices that are based on the portion of the page offset and one or more variations of the portion of the virtual page number;
   circuitry configured to compare a physical page number that is associated with the virtual page number to the one or more primary tags to determine whether there is a primary matching way;
   circuitry configured to compare the physical page number to the one or more secondary tags to determine whether there are one or more secondary matching ways;
   circuitry configured to return, if the cache request is associated with a load instruction, read data from the primary matching way or the one or more secondary matching ways; and
   circuitry configured to write, if the cache request is associated with a store instruction, store data to the primary matching way if it exists and perform an alias management operation if the one or more secondary matching ways exist.

18. The system of claim 17, wherein the alias management operation comprises writing the store data to the one or more secondary matching ways.

19. The system of claim 17, wherein the alias management operation comprises invalidating the one or more secondary matching ways.

20. The system of claim 17, wherein the one or more primary tags and the one or more secondary tags are concurrently compared to the physical page number.

* * * * *